(12) United States Patent
Jehn-Rendu et al.

(10) Patent No.: US 11,306,441 B2
(45) Date of Patent: Apr. 19, 2022

(54) COMPOSITION COMPRISING CROSS-LINKED ANIONIC, ORGANIC POLYMERIC MICROPARTICLES, ITS PREPARATION AND USE IN PAPER AND PAPERBOARD MAKING PROCESSES

(71) Applicant: SOLENIS TECHNOLOGIES CAYMAN, L.P., George Town (KY)

(72) Inventors: Christian Jehn-Rendu, Ludwigshafen (DE); Anja Thomas, Ludwigshafen (DE); Rosa Corberan Roc, Ludwigshafen (DE)

(73) Assignee: Solenis Technologies, L.P., Wilmington, DE (US)

( * ) Notice: Subject to any disclaimer, the term of this patent is extended or adjusted under 35 U.S.C. 154(b) by 0 days.

(21) Appl. No.: 16/644,183

(22) PCT Filed: Sep. 7, 2018

(86) PCT No.: PCT/EP2018/074085
§ 371 (c)(1),
(2) Date: Mar. 4, 2020

(87) PCT Pub. No.: WO2019/048587
PCT Pub. Date: Mar. 14, 2019

(65) Prior Publication Data
US 2020/0217015 A1 Jul. 9, 2020

(30) Foreign Application Priority Data
Sep. 8, 2017 (EP) ..................................... 17190180

(51) Int. Cl.
| D21H 21/10 | (2006.01) |
| C08F 220/06 | (2006.01) |
| D21H 17/40 | (2006.01) |
| D21H 17/00 | (2006.01) |
| D21H 21/52 | (2006.01) |
| D21H 23/22 | (2006.01) |

(52) U.S. Cl.
CPC ........... *D21H 21/10* (2013.01); *C08F 220/06* (2013.01); *D21H 17/40* (2013.01); *D21H 17/74* (2013.01); *D21H 21/52* (2013.01); *D21H 23/22* (2013.01); *C08F 2810/20* (2013.01)

(58) Field of Classification Search
USPC .................................................... 162/164.6
See application file for complete search history.

(56) References Cited

U.S. PATENT DOCUMENTS

| 4,021,364 A | 5/1977 | Speiser et al. | |
| 4,681,912 A * | 7/1987 | Durand | B01F 17/0085 |
| | | | 524/827 |
| 5,167,766 A * | 12/1992 | Honig | D21H 21/54 |
| | | | 162/164.1 |
| 6,406,593 B1 | 6/2002 | Heard et al. | |
| 7,641,766 B2 | 1/2010 | St. John et al. | |
| 2002/0066540 A1 * | 6/2002 | Chen | D21H 21/10 |
| | | | 162/17 |

FOREIGN PATENT DOCUMENTS

| EP | 0129078 A1 | 12/1984 |
| EP | 0173605 A2 | 3/1986 |
| EP | 0202780 A2 | 11/1986 |
| EP | 0235893 A1 | 9/1987 |
| EP | 0462365 A1 | 12/1991 |
| EP | 0484617 * | 5/1992 |
| EP | 0484617 A1 | 5/1992 |
| EP | 484617 A1 | 5/1992 |
| GB | 2161492 A | 1/1986 |
| JP | 2003246909 A | 9/2003 |
| RU | 2247185 C2 | 2/2005 |
| RU | 2361977 C2 | 7/2009 |
| WO | 0233171 A1 | 4/2002 |
| WO | 2008049748 A1 | 5/2008 |
| WO | WO 2008049748 * | 5/2008 |
| WO | 2015158668 A1 | 10/2015 |

OTHER PUBLICATIONS

Leong et al., J. Phys. Chem. 1982, vol. 86, No. 13, 2269-2271, Publication Date: Jun. 1, 1982, https://doi.org/10.1021/100210a001.
ISA/EP, International Search Report and Written Opinion issued in Int. Appl. No. PCT/EP2018/074085 dated Dec. 10, 2018.
J.O. Staffers T. Bone (1980) Polymerization in Water in Oil Microemulsion Systems Containing Methyl Methacrylate, Journal of Dispersion Science and Technology, 1:1, 37-54, DOI: 10.1080/01932698008962160.
J. Am. Chem. Soc. 1981, 103,14, 4279-4280, Publication Date: Jul. 1, 1981, https://doi.org/10.1021/ja00404a065.
P.P. Speiser et al., Polymerized Micelles and Their Use as Adjuvants in Immunology, Journal of Pharmaceutical Sciences, vol. 65, issue 12, p. 1763-1766, Dec. 1, 1976.
Xin et al., "Preparation of P(AM-AA-AMPS) polymer microspheres by inverse emulsion polymerization", Chemical Engineering of Oil & Gas, vol. 43, Issue 5, pp. 539-542, Publication Date: Dec. 31, 2014.

\* cited by examiner

*Primary Examiner* — Mark Halpern
(74) *Attorney, Agent, or Firm* — Lorenz & Kopf, LLP (57) ABSTRACT

The present invention concerns a composition being an inverse emulsion comprising cross-linked anionic, organic polymeric microparticles, said microparticles having an unswollen z-average particle size diameter of less than 0.75 µm, wherein the organic polymeric microparticles are formed from a monomer mixture comprising
(a) an ethylenically unsaturated carboxylic acid, or a salt thereof;
(b) an ethylenically unsaturated non-ionic monomer; and
(c) from 1 to 10 mole % of 2-acrylamido-2-methylpropanesulphonic acid, or a salt thereof.
The invention also provides a process for preparing the composition, the use of the composition in a paper or paperboard making process and methods of making paper or paperboard employing said composition.

16 Claims, 1 Drawing Sheet

Figure 1

COMPOSITION COMPRISING CROSS-LINKED ANIONIC, ORGANIC POLYMERIC MICROPARTICLES, ITS PREPARATION AND USE IN PAPER AND PAPERBOARD MAKING PROCESSES

CROSS-REFERENCE TO RELATED APPLICATIONS

This is a National Stage of International Application No. PCT/EP2018/074085, filed Sep. 7, 2018, which claims the benefit of European Patent Application No. 17190180.4, filed Sep. 8, 2017.

BACKGROUND OF THE INVENTION

Field of the Invention

The present invention relates to structured anionic polymeric microparticles and a method for the preparation. The present invention also relates to paper and paperboard manufacturing processes in which the anionic polymeric microparticles are employed and the use of said anionic polymeric microparticles in paper and paperboard making processes.

Description of the Prior Art

EP 235893 provides a process wherein a water-soluble substantially linear cationic polymer is applied to the papermaking stock prior to a shear stage and then re-flocculating the stock by introducing bentonite after that shear stage.

Cross-linked anionic, organic polymeric compositions are known to be useful in a variety of applications. It is known to employ such compositions in a variety of solid-liquid separation processes, particularly in the flocculation of various dispersions of suspended solids, such as sewage sludge and in treatment of cellulosic paper pulp suspensions. There is a desire to improve upon the effectiveness of flocculating agents in respect of their ability to bring about efficient solids liquid separation.

EP 0202780 describes the preparation of polymeric, cross-linked, cationic acrylamide polymer particles by a conventional inverse emulsion polymerisation process. Cross-linking is achieved by the incorporation of a multifunctional monomer, such as methylenebisacrylamide, into the polymer. The cross-linked polymeric particles are useful as flocculants.

Typically, the particle size of polymers prepared by conventional inverse water in oil emulsion polymerisation processes are limited to a range of about 1-5 μm. The precise particle size which is achievable in inverse emulsions is determined by the concentration and activity of surfactant(s) employed and these are customarily chosen on the basis of emulsion stability and economic factors.

Leong et al, in Inverse Microemulsion Polymerisation, J. of Phys. Chem., Vol 86, No 23, 6-24-82, pp 2271-3, discloses polymerisation of acrylamide in an inverse microemulsion. The author, also discloses having prepared cross-linked polyacrylamide latices or microgels by using a 100:1 mixture of acrylamide-methylenebisacrylamide.

EP 0173605 teaches the production of microbeads having a diameter ranging from about 49-87 nm and produced from 10 polymers of vinyl acetate (84.6), ethyl acrylate (65.4) and acrylic acid (4.5) or methacrylonitrile (85), butyl acrylate (65) and acrylic acid (3). These polymeric beads are disclosed as added to an LBKP pulp slurry in order to evaluate the resultant paper for sizing degree, paper force enhancement and repulpability.

Further, U.S. Pat. No. 4,681,912 discloses the production of microparticles of acrylamide and acrylic acid, for example utilising a micro-emulsion process. There does not appear to be any teaching of the particles being cross-linked or their use in papermaking.

Additionally, EP 0484617 discloses a composition comprising cross-linked anionic or amphoteric, organic polymeric microparticles. These microparticles are said to have an unswollen number average particle size diameter of less than about 0.75 μm, a solution viscosity of at least about 1.1 mPas and a cross-linking agent content of above about 4 molar parts per million, based on the monomer units present in the polymer, and an ionicity of at least about 5.0%. It is indicated that the microparticle may be composed of at least one anionic monomer selected from acrylic acid, methacrylic acid, ethacrylic acid, 2-acrylamido-2-methylpropanesulphonic acid or mixtures or salts thereof. There is no indication of how such a mixture of anionic monomers should be combined and in what proportions. Further, the only examples employing 2-acrylamido-2-methylpropanesulphonic acid, as its sodium salt, do not employ an ethylenically unsaturated carboxylic acid in the monomer mixture.

EP 462365 describes a method of making paper which comprises adding to an aqueous paper furnish ionic, organic, polymeric microbeads. These microbeads are indicated as having an unswollen particle diameter of less than 700 nm if cross-linked and less than 60 mm if non-cross-linked and water insoluble. The ionicity is described as being at least 1%, but at least 5% if cross-linked, anionic and used as the sole retention additive.

WO 02/33171 provides a process for making paper or paperboard in which a cellulosic suspension is flocculated and then drained on a screen to form a sheet which is dried. The suspension is flocculated using a flocculation system which comprises a siliceous material and organic microparticles which have an unswollen particle diameter of less than 750 nm. A preferred embodiment additionally employs at least one flocculant/coagulant which is preferably a water-soluble cationic polymer in the flocculation system.

WO 2015/158668 describes a method for making a direct emulsion of a copolymer in water, in which the copolymer is based on a) 10-80% by weight methacrylic acid and, optionally, of acrylic acid; b) 15-80% by weight of at least one non-ionic vinyl monomer; c) 0.05-9.5% by weight of 2-acrylamido-2-methyl propane sulphonic acid or a salt thereof; d) 0.5-30% by weight of at least one monomer containing at least one hydrophobic group; and e) 0.01-5% by weight of at least one cross-linking monomer. The emulsion is indicated as being useful for thickening aqueous systems, such as thickening personal care or cosmetic formulations in acid conditions.

The aforementioned microparticle products have been effective retention aid products for the years since their development. Nevertheless, there is a desire to provide improved retention aid products for paper and paperboard making processes. Further, with modern papermaking and paperboard making processes there is an increased desire to improve upon the retention and especially ash retention.

DESCRIPTION OF THE INVENTION

According to one aspect of the present invention there is provided a composition being an inverse emulsion comprising cross-linked anionic, organic polymeric microparticles, said microparticles having an unswollen z-average particle size diameter of less than 0.75 μm, wherein the organic polymeric microparticles are formed from a monomer mixture comprising
(a) an ethylenically unsaturated carboxylic acid, or a salt thereof;
(b) an ethylenically unsaturated non-ionic monomer; and
(c) from 1 to 10 mole % of 2-acrylamido-2-methylpropanesulphonic acid, or a salt thereof.

In a further aspect of the present invention we provide a process for preparing the aforementioned composition which comprises cross-linked anionic, organic polymeric microparticles, said microparticles having an unswollen z-average particle size diameter of less than 0.75 μm, comprising:
(A) admixing
  (i) an aqueous solution of a monomer mixture comprising
    (a) an ethylenically unsaturated carboxylic acid, or a salt thereof;
    (b) an ethylenically unsaturated non-ionic monomer; and
    (c) from 1 to 10 mole % of 2-acrylamido-2-methylpropanesulphonic acid, or a salt thereof;
  (ii) an oil phase comprising at least one hydrocarbon liquid;
  (iii) an effective amount of surfactant or surfactant mixture, so as to form an inverse emulsion; and
(B) subjecting the inverse emulsion obtained in step (A) to polymerisation conditions.

By inverse emulsion we mean a water in oil emulsion. The term "emulsion" used throughout this specification is intended to include both conventional emulsions and microemulsions, unless otherwise stipulated. Where the term microemulsion is used it is intended to refer only to microemulsion, as defined herein. Preferably the oil in the inverse emulsion is a hydrocarbon.

By unswollen we mean that the z-average particle size diameter is based on microparticles that contain only water from the monomers polymerised to form the microparticles.

Particle sizes can be determined by dynamic light scattering (DLS), e.g., using a Zetasizer Nano from Malvern). The given z-average particle size is the intensity weighted harmonic mean size (see also ISO 22412) calculated by the methods of cumulants from the second moment of cumulant expansion. The calculation is defined in ISO 13321 and ISO 22412.

The inventive composition is useful as retention aids in processes of making paper and paperboard. This is normally achieved by preparing an aqueous formulation from the inverse emulsion composition.

Thus, the invention also provides for a method of producing paper or paperboard in which a cellulosic suspension is provided and drained on a screen to form a sheet which is dried, wherein the method employs a retention system which is applied to the cellulosic suspension. The retention system should comprise an aqueous product prepared from the aforementioned composition, which comprises the above described cross-linked, anionic, organic polymeric microparticles which have an unswollen z-average particle size diameter of less than 0.75 μm.

The organic polymeric cross-linked microparticles may be rendered cross-linked by any suitable means customarily used in the cross-linking of acrylic polymers and described in the literature. It may, for instance, be desirable to subject the formed organic polymeric microparticles to radiation or thermal treatment to induce cross-linking. Alternatively, it may be desirable to apply a chemical cross-linking agent to the formed organic polymeric microparticles.

Preferably, however, a suitable chemical cross-linking agent is included into the monomer mixture before or during polymerisation such that the organic polymeric microparticles are formed as cross-linked entities. Suitably, such a chemical cross-linking agent should be a multi functional which reacts with functional groups on at least two polymer chains to bring about chemical linkages between the at least two polymer chains. Preferably the monomer mixture comprises at least one multi functional compound selected from the group consisting of N,N'-methylenebisacrylamide, N,N'-methylenebismethacrylamide, polyethyleneglycol dimethacrylate, polyethyleneglycol diacrylate, N-vinylacrylamide, glycidyl acrylate, divinylbenzene, di-, tri-, or tetraallyl ammonium salts, acrolein, aldehydes, glyoxal, diepoxy compounds, epichlorohydrin and mixtures thereof.

Such multifunctional compounds would tend to combine at least two polymerising chains during the polymerisation process. A particularly preferred multifunctional compound for preparing the cross-linked, anionic, organic, polymeric microparticles of the inventive composition is N,N'-methylenebisacrylamide.

The ethylenically unsaturated carboxylic acid component (a) of the monomer mixture may be selected from any suitable compound in this category. Typically, suitable compounds for this application include one or more of acrylic acid, methacrylic acid, ethacrylic acid, maleic acid, fumaric acid, itaconic acid, crotonic acid, including salts thereof. Suitable salts include ammonium or metal ion salts, such as alkali metal salts, alkaline earth metals salts, or aluminium salts etc. Ammonium, lithium, sodium or potassium salts are more suitable. Particularly suitable salts are ammonium and sodium salts.

Preferred compounds as ethylenically unsaturated carboxylic acid component (a) are acrylic acid or methacrylic acid or salts thereof, especially acrylic acid, particularly as the ammonium or sodium salts.

Typically, the ethylenically unsaturated non-ionic monomers used as component (b) are suitably hydrophilic monomers, and desirably water-soluble monomers. By water-soluble we mean that it has a solubility in water of at least 5 g per 100 mL of water at 25° C. Desirable ethylenically unsaturated non-ionic monomers for use as component (b) in the monomer mixture include any of the compounds selected from the group consisting of acrylamide, methacrylamide, N,N-dialkylacrylamides, N-alkylacrylamides, N,N-dialkyl methacrylamides, N-alkyl methacrylamides, N-vinylmethacetamide, N-vinyl methyl formamide, vinyl acetate, N-vinyl pyrrolidone and mixtures thereof. More desirably the ethylenically unsaturated non-ionic monomer is selected from any of acrylamide, methacrylamide or mixtures thereof. More preferably acrylamide is employed as the non-ionic monomer.

Desirably the amount of ethylenically unsaturated carboxylic acid, or salt thereof, (component (a)) should be at least 1 mole %, and typically at least 10 mole %. Usually the amount is at least 20 mole %, for instance up to 98 mole %. Typically, however, the ethylenically unsaturated carboxylic acid should be from 30 to 94 mole %, or from 40 to 90 mole %, for instance from 40 to 80 mole %, or 40 to 70 mole %, more preferably 45 to 65 mole %.

Suitably the amount of ethylenically unsaturated non-ionic monomer (component (b)) should be at least one mole %, for instance up to 98 mole %. Usually the amount would be up to 75 mole %, for instance up to 65 mole %. Typically, however, the ethylenically unsaturated non-ionic monomer should be from 1 to 65 mole %, preferably from 5 to 55 mole %, such as from 10 to 55 mole %, or from 20 to 55 mole %, more preferably from 30 to 50 mole %.

Preferably the composition of the present invention employs a monomer mixture which comprises:
(a) from 40 to 90 mole % of an ethylenically unsaturated carboxylic acid, or a salt thereof;
(b) from 5 to 55 mole % of an ethylenically unsaturated non-ionic monomer; and
(c) from 1 to 10 mole % of 2-acrylamido-2-methylpropanesulphonic acid, or a salt thereof.

More preferably the monomer mixture comprises:
(a) from 45 to 65 mole % of ethylenically unsaturated carboxylic acid, or salts thereof;
(b) from 30 to 50 mole % of ethylenically unsaturated non-ionic monomer; and
(c) from 1 to 10 mole % of 2-acrylamido-2-methylpropanesulphonic acid, or a salt thereof.

It is particularly preferred that the monomer mixture comprises:
(a) from 45 to 65 mole % of acrylic acid, or salts thereof, especially the ammonium salt or sodium salt;
(b) from 30 to 50 mole % of acrylamide; and
(c) from 1 to 10 mole % of 2-acrylamido-2-methylpropanesulphonic acid, or a salt thereof.

The 2-acrylamido-2-methylpropanesulphonic acid, or a salt thereof, (component (c)) may be in the form of any suitable salt, typically as the ammonium salt or a metal salt. A metal salt may for instance be an alkali metal salt, alkaline earth metal salt or an aluminium salt. Particularly suitable salts are the ammonium, sodium, lithium or potassium salts, especially the sodium salt.

Preferably the 2-acrylamido-2-methylpropanesulphonic acid, or a salt thereof, (component (c)) is present in the monomer mixture in an amount of from 2 to 8 mole %, more preferably from 2.5 to 7.5 mole %.

The unswollen z-average particle size diameter is below 0.75 μm. Desirably, the unswollen z-average particle size diameter is less than 0.5 μm, and typically in the range of from 0.08 to 0.5 μm, for instance from 0.1 to 0.4 μm.

In the preferred form of the process for the preparation of the inventive composition the aqueous solution of the monomer mixture also contains at least one of the aforementioned multifunctional compounds. More preferably the multifunctional compound included in the aqueous solution of the monomer mixture is N,N'-methylenebisacrylamide. Preferably still, the anionic monomer included in this aqueous monomer mixture is acrylic acid, ammonium acrylate or sodium acrylate. Equally preferably, the non-ionic monomer included in this aqueous monomer mixture is acrylamide.

In a preferred form of the invention the aqueous solution of the monomer mixture, optionally comprising the multifunctional compound; an oil phase comprising a saturated hydrocarbon; and an effective amount of a surfactant mixture are combined. Preferably the surfactant may include polyoxyethylene (20) sorbitan monooleate, polyoxyethylene sorbitol hexaoleate, sorbitan sesquioleate or mixtures thereof. The amount of particular surfactant employed should be sufficient to produce particles of less than 0.75 μm in unswollen z-average particle size diameter.

It may also be desirable to employ a sequestering agent in the aqueous solution of the monomer mixture in order to remove substances which may inhibit polymerisation, such as heavy metal ions, for instance copper ions. Suitable sequestering agents include trisodium nitrilo triacetate, ethylenediamine tetra acetic acid (EDTA) including salts such as the sodium salts, diethylenetriamine penta acetic acid (DTPA) including salts such as the sodium salts, methyl glycine diacetic acid (MGDA) including salts such as the sodium salts.

It may also be desirable to include other additives into the aqueous solution of the monomer mixture. Such an additional additive may, for instance, include chain transfer agents. Typical chain transfer agents customarily employed may, for instance, include an alcohol, mercaptan, phosphite, sulphite or mixtures thereof. Specific examples include sodium hypophosphite or 2-mercaptoethanol.

Polymerisation of the inverse emulsion may be carried out by adding a polymerisation initiator, such as a redox initiator system which employs a combination of an oxidising agent and the reducing agent. Suitable reducing agents include sodium metabisulphite, sodium bisulphite or sulphur dioxide and suitable oxidising agents include tertiary butyl hydroperoxide. The sulphur dioxide may, for instance, be dissolved in a suitable oil, typically the same oil as the oil used in the inverse emulsion. Alternatively, polymerisation may be initiated by subjecting the inverse emulsion to ultraviolet irradiation which may also involve including a UV initiator compound, typically into the aqueous solution of the monomer mixture. Preferably, the inverse emulsion polymerisation is conducted using a redox initiator system. In one case, the oxidising agent would be included in the aqueous solution of the monomer mixture and the reducing agent would subsequently be added to the oil phase of the emulsion. This is particularly so when the reducing agent is an oil-soluble compound such as sulphur dioxide. Alternatively, both initiators of the redox couple may be fed into the emulsion once formed. Desirably, in this case the reducing agent and oxidising agent may both be fed into the emulsion each as aqueous solutions. This is particularly so, when the reducing agent is a water-soluble compound such as sodium metabisulphite or sodium bisulphite. By water-soluble we mean that it has a solubility in water of at least 5 g per 100 mL of water at 25° C.

The preferred way of achieving cross-linking of the anionic, organic, polymeric microparticles is by including one or more of the aforementioned multifunctional compounds, particularly N,N'-methylenebisacrylamide. Typically, the multifunctional compound may be included in the monomer mixture in an amount of at least 4 ppm, determined on the dry weight of the monomer mixture. Suitably the amount of multifunctional compound may be from 4 to 12,000 ppm, for instance from 4 to 9000 ppm, such as from 4 to 6000 ppm, preferably from 20 to 6000 ppm, more preferably from 20 to 4000 ppm, still more preferably from 50 to 2000 ppm, most preferably from 50 to 1000 ppm.

One method of obtaining the polymeric microparticles of this invention is to polymerise the monomers in a microemulsion. Polymerisation in microemulsions and inverse microemulsions is known to those skilled in the art. P Speiser reported in 1976 and 1977 a process for making spherical "nanoparticles" with diameters less than 800 Å by (1) solubilisation of polymerising molecules, e.g. acrylamide and methylenebisacrylamide and other materials, e.g. drugs in micelles and (2) polymerising the monomer is in the micelles. J. Pharm. Sa., 65(12), 7063 (1976) and U.S. Pat. No. 4,021,364. Both inverse water in oil and oil in water "nanoparticles" were prepared by this process. While not specifically called microemulsion polymerisation by the author, this process does contain all the features which are currently used to define microemulsion polymerisation. These reports also constitute the first examples of polymerisation of acrylamide in a microemulsion. Since then, numerous publications reporting polymerisation of hydrophobic polymers in the oil phase of microemulsions have appeared. See, for example, Stoffer and Bone, J. Dispersion Sci. and Tech., 1(1), 37, 1980 and Atik and Thomas, J. Am. Chem. Soc'y, 103(14), 4279 (1981); and GB 2161492A.

The microemulsion polymerisation process may be conducted by (i) preparing a monomer microemulsion by adding an aqueous solution of the monomer mixture to a hydrocarbon liquid containing appropriate surfactant or surfactants mixture to form an inverse monomer microemulsion consisting of small aqueous droplets which, when polymerised, result in polymer particles of less than 0.75 µm in size, dispersed in the continuous oil phase and (ii) subjecting the monomer microemulsion to free radical polymerisation.

In order to obtain an inverse microemulsion, it is generally necessary to use particular conditions whose main parameters are as follows: surfactant concentration, HLB of surfactant or subtracted mixture, temperature, nature of the organic phase and composition of the aqueous phase.

The aqueous phase comprises an aqueous mixture of the monomers of the monomer mixture and optionally the multifunctional compound, to achieve cross-linking during the polymerisation, as defined above. The aqueous monomer mixture may also comprise such conventional additives as desired. For example, the mixture may contain sequestering agents to remove polymerisation inhibitors, such as heavy metal ions, such as copper ions, as given above. The aqueous monomer mixture may also include pH adjusters, initiators and other conventional additives as provided for previously.

Important to the formation of the microemulsion, which may be defined as a swollen, transparent and thermodynamically stable micelle solution without agitation comprising two liquids insoluble in each other and a surfactant, in which the micelles are much smaller than in a conventional emulsion, is the selection of appropriate organic phase and surfactant.

The selection of the organic phase has a substantial effect on the minimum surfactant concentration necessary to obtain the inverse microemulsion. This organic phase may comprise of a hydrocarbon or hydrocarbon mixture. Saturated hydrocarbons or mixtures thereof are the most suitable in order to obtain inexpensive formulations (lower surfactant content) of inverse microemulsions. Typically, the organic phase may comprise any of benzene, toluene, fuel oil, kerosene, odourless mineral spirits and mixtures of any of the foregoing. Preferred hydrocarbons for use as the organic phase include Exxsol D 100S or Exxsol D100.

The ratio by weight of the amounts of aqueous and hydrocarbon phases is chosen as high as possible so as to obtain, after polymerisation, a microemulsion of high polymer content. Practically, this ratio may range, for example from 0.5:1 to 3:1, typically from 1.5:1 to 2.5:1 and desirably may be approximately 2:1.

The one or more surfactants may desirably be selected in order to obtain an HLB (Hydrophilic Lipophilic Balance) value ranging from 8 to 11. In addition to the appropriate HLB value, the concentration of surfactant must also be optimised, i.e. sufficient to form an inverse emulsion having the correct particle size. Typical surfactants useful in the practice of this invention, in addition to those specifically discussed above, may be anionic, cationic or non-ionic and are selected from polyoxyethylene (20) sorbitan trioleate, sorbitan trioleate, sodium di-2-ethyl hexyl sulfosuccinate, oleamido propyl dimethyl amine, sodium isostearyl-2-lactate, sorbitan sesquioleate, polyoxyethylene sorbitol hexaoleate and the like.

Polymerisation of the emulsion may be carried out in any manner noted those skilled in the art. Initiation may be affected with a variety of thermal and redox free radical initiators including azo compounds such as azobisisobutyronitrile; peroxides, such as tertiary butyl peroxides; tertiary butyl hydroperoxide; inorganic compounds, such as potassium persulphate and redox couples, such as ferrous ammonium sulphate/ammonium persulphate, tertiary butyl hydroperoxide/sodium (meta) bisulfite or tertiary butyl hydroperoxide/sulfur dioxide. Polymerisation may also be affected by photochemical irradiation processes, irradiation, or by ionising radiation with a 60 Co source.

In one alternative form of this invention the emulsion or microemulsion may be prepared in a two-stage process.

In a first stage, the oil phase containing the surfactant is combined with a portion of the aqueous solution of the monomer mixture to form an inverse emulsion or inverse microemulsion and a first stage polymerisation is carried out. In a second stage, the remainder of the aqueous solution of the monomer mixture would be combined with the inverse emulsion or inverse microemulsion and the subsequently formed inverse emulsion or inverse microemulsion is subjected to a further polymerisation stage in which the monomer contained therein is polymerised. This two-stage process is particularly useful for forming emulsions and microemulsions containing high polymer microparticle solids content.

Preparation of an aqueous formulation from the inverse emulsion may be effected by inversion by adding it to water which may contain a breaker surfactant. Suitable surfactants for inverting the emulsion into water to form the aqueous product include, for instance Lutensol® T089 produced by BASF or Alfonic® 1412-7 Ethoxylate available from Sasol Chemicals. Optionally, the polymer may be recovered from the inverse emulsion by stripping or by adding the emulsion to a solvent which precipitates the polymer e.g. isopropanol, filtering of the resultant solids, drying and re-dispersing in water. Suitably, the aqueous formulation may contain from 0.01 to 5% by weight of the cross-linked anionic organic polymeric microparticles based on the total weight of the aqueous formulation. Desirably, the aqueous formulation may contain from 0.05 to 2% by weight of the polymeric microparticles, typically from 0.1 to 1% by weight of the polymeric microparticles, for instance from 0.5 to 1% by weight of the polymeric microparticles.

The inverse emulsion may be produced to any suitable solids content. This may for instance be up to 50% by total weight of emulsion. In general, the solids content of the dispersed microparticles may be from 15 to 50% by total weight of the emulsion, suitably from 20 to 50% by weight, generally from 30 to 45% by weight, for instance from 30 to 40% by weight. The polymer microparticles dispersed within the emulsion may have an active polymer content of up to 50% by weight. Suitably, this may be from 20 to 45% active polymer by weight and usually from 25 to 45% active polymer and typically from 25 to 40% by weight, for instance from 30 to 35% by weight.

Desirably, the cross-linked anionic, organic polymeric microparticles of the present invention has a standard viscosity of at least 1.1, preferably from 1.1 to 2.2 mPas, more preferably from 1.5 to 2.0 mPas. Standard Viscosity is determined using 0.1% by weight of the cross-linked anionic, organic polymeric microparticles in one molar aqueous sodium chloride at 25° C. using a Brookfield LVT viscometer with UL adapter.

The product of this invention is suitable for facilitating a wide variety of solid liquid separation processes. Typically, this may be for instance to dewater biologically treated suspensions, such as sewage and other municipal or industrial sludges, the drainage of cellulosic suspension is, such as those found in paper and paperboard production or in the treatment of paper or paperboard production wastes; and in the settling and dewatering of a variety of inorganic suspensions, for instance refinery waste, coal waste etc.

The composition of this invention is particularly suitable as a retention aid in a process of producing paper or paperboard.

As described above, the present invention also provides a method of producing paper or paperboard. The method involves providing a cellulosic suspension which is drained on a screen to form a sheet which is dried. In this method, a retention system is applied to the cellulosic suspension and in which the retention system comprises the inventive composition, particularly as an aqueous formulation prepared from the inventive composition, comprising the cross-linked, anionic, organic polymeric microparticles.

In a preferred form of this embodiment the retention system comprises (i) an aqueous formulation prepared from the inventive composition; and (ii) a cationic polymer. Typically, the cationic polymer may be any suitable cationic polymer conventionally used as part of a retention system in paper or paperboard making processes. Desirably, such cationic polymer would frequently be a water-soluble cationic polymer. By water-soluble we mean that the cationic polymer would have a solubility in water at 25° C. of less than 10 lumps per 1 g of cationic polymer determined by the Lump Count Method. Particular suitable cationic polymers may be selected from the group consisting of cationic polyacrylamides, polymers containing vinyl amine units, cationic polyacrylates and polymers of diallyl dimethyl ammonium chloride. The cationic polymers may, for instance, be a suitable cationic polymer which has a charge density of below 4 meq/g, typically below 3.5 meq/g and usually below 3.0 meq/g.

The Lump Count Method requires placing 1.000 g±0.005 g of the polymer into an 8 ounce bottle and adding 5 mL±0.1 mL of acetone into the bottle to wet the polymer, followed by adding 95 mL of deionised water into the bottle. The bottle containing the polymer, acetone and deionised water is tumbled for two hours to form a solution of the polymer. The polymer solution is then poured onto a 150 μm stainless steel sieve. When most of the polymer solution has run through the sieve, the bottle is filled with water and then poured onto the sieve to ensure all polymer solution is removed from the jar. Cold running water is then run through the sieve to remove any excess polymer solution and then the back of the sieve is dried. The number of lumps retained on the sieve is then counted. The method is carried out at 25° C.

Desirably, the cationic polymer may be prepared using a water-soluble ethylenically unsaturated monomer or blend of water-soluble ethylenically unsaturated monomers in which at least one of the monomers is cationic. By water-soluble we mean that the monomer or blend of monomers would have a solubility in water of at least 5 g of the monomer in 100 mL of water at 25° C.

Where the polymers are formed from more than one monomer the other monomers may be either cationic or non-ionic or a mixture. Nevertheless, it is preferred that the cationic polymer is formed entirely from cationic monomer or a mixture of monomers containing at least one cationic monomer and at least one non-ionic monomer.

Suitable cationic monomers include dialkyl amino alkyl (meth) acrylates, dialkyl amino alkyl (meth) acrylamides, including acid addition and quaternary ammonium salts thereof, diallyl dimethyl ammonium chloride. Preferred cationic monomers include the methyl chloride quaternary ammonium salts of dimethyl amino ethyl acrylate and dimethylamino ethyl methacrylate. Suitable non-ionic monomers include ethylenically unsaturated non-ionic monomers, for instance acrylamide, methacrylamide, hydroxy ethyl acrylate, N-vinyl pyrrolidone. A particularly preferred polymer includes the copolymer of acrylamide with the methyl chloride quaternary ammonium salts of dimethyl amino ethyl acrylate.

Generally, suitable cationic polymers will tend to have high molar mass, usually in excess of 500,000 Da and often at least 1 million Daltons. Typically, the suitable cationic polymers would exhibit an intrinsic viscosity of at least 3 dl/g and preferably at least 4 dl/g. In frequent cases the polymers may exhibit intrinsic viscosities of at least 5 and often at least 6 dl/g. In many cases the intrinsic viscosity may be at least 7 or even at least 8.5 or 9 dl/g, and often at least 10 dl/g and more preferably at least 12 dl/g and particularly at least 14 or 15 dl/g. There is no maximum molecular weight for this cationic polymer and so there is no particular upper value of intrinsic viscosity. In fact, the intrinsic viscosity may even be as high as 30 dl/g or higher. Generally, though, the cationic polymer often has an intrinsic viscosity of up to 25 dl/g, for instance up to 20 dl/g.

Intrinsic viscosity of the polymers may be determined by preparing an aqueous solution of the polymer (0.5-1% w/w) based on the active content of the polymer. In a first step, 2 g of this 0.5-1% polymer solution is diluted to 100 mL in a volumetric flask with 50 mL of 2M sodium chloride solution that is buffered to pH 7.0 (using 1.56 g sodium dihydrogen phosphate and 32 point to 6 g disodium hydrogen phosphate per litre of deionised water) and the whole is diluted to the 100 mL mark with deionised water. The intrinsic viscosity of the polymers is measured using a Number 1 suspended level viscometer at 25° C. in 1M buffered salt solution. Intrinsic viscosity values stated are determined according to this method unless otherwise stated.

Another suitable class of the cationic polymer would include polymers of vinyl carboxamides. Suitably these may be prepared as the homopolymer or copolymer, for instance with acrylamide. Desirably the vinyl carboxamides includes N-vinyl formamide and N-vinyl acetamides. Typically, the vinyl carboxamide polymers would be hydrolysed to generate vinyl amine units. The degree of hydrolysis may be, for instance, sufficient to generate from 5 to 90 mole % vinyl amine units, preferably from 5 to 50 mole %, more preferably from 10 to 40 mole %, particularly from 10 to 30 mole %, such as from 10 to 20 mole %. More preferred cationic polymers of this category may have a cationicity of below 4 meq/g, for instance from 0.5 to 3 meq/g, preferably from 1.0 to 2.5 meq/g, such as from 1.0 to 2.0 meq/g. The cationic polymers of this class may have molar masses up to 3 million Daltons, but generally up to 2 million Daltons or 2.5 million Daltons. Suitably the molar mass may be at least 50,000 Da and suitably may be at least 100,000 Da. Frequently the molar mass may be as high as 200,000 Da or even at least 500,000 Da, and desirably at least 750,000 Da, often at least 800,000 Da. Typically the molar mass will be at least 900,000 Da or even at least 1 million Daltons or in some cases at least 1.1 million Daltons. The molar mass may for instance be from 1 million Daltons to 2 million Daltons, for instance from 1.1 million Daltons to 1.8 million Daltons.

Other suitable cationic polymers which may be added as the cationic polymer in the retention system or additionally to the cationic polymer of the retention system include relatively lower molar mass polymers. Typical other cationic polymers include polyethylenimines, amine epichlorohydrin adducts, diallyl dimethyl ammonium chloride homopolymers and poly amido amines.

In a further preferred form of the process of making paper or paperboard the retention system comprises (i) an aqueous formulation prepared from the inventive composition; (ii) a cationic polymer; and (iii) and inorganic microparticle.

The inorganic microparticle may, for instance, be any suitable finely divided inorganic particulate material. The inorganic microparticle may for instance be a swellable clay or alternatively may be a silica-based material. Suitably, the inorganic microparticle may be selected from the group consisting of silica-based particles, silica microgels, colloidal silica, silica sols, silica gels, polysilicates, cationic silica, aluminosilicates, poly aluminosilicates, borosilicates, poly borosilicates, zeolites, bentonite, hectorite, smectites, montmorillonites, nontronites, saponite, sauconite, hormites, attapulgites, and sepiolites.

The cellulosic suspension may typically be made from suitable cellulosic fibres such as mechanical fibre, wood free fibre, recycled paper fibre or mixtures thereof. By mechanical fibre we mean that the cellulosic suspension comprises mechanical pulp, indicating any wood pulp manufactured wholly or in part by a mechanical process, including stone ground wood (SGW), pressurised ground wood (PGW), thermomechanical pulp (TMP), chemithermomechanical pulp (CTMP) or bleached chemithermomechanical pulp (BCTMP). Mechanical paper grades contain different amounts of mechanical pulp, which is usually included in order to provide the desired optical and mechanical properties. In some cases, the pulp used in making filled paper may be formed entirely of one or more of the aforementioned mechanical pulps. In addition to the mechanical pulps other pulps are often included in the cellulosic suspension. Typically, the other pulps may form at least 10% by weight of the total fibre content. These other pulps included in the papermaking recipe include deinked pulp and sulphate pulp (often referred to as kraft pulp). Wood free pulp means a chemical pulp rather than a mechanical pulp. Such wood free of chemical pulp is normally made from pulp wood, but would not be considered ward as most of the lignin is removed from the cellulosic fibres during mechanical processing.

The cellulosic suspension may also contain filler. The filler may be any traditionally used filler material, for instance a clay such as kaolin, or filler may be a calcium carbonate which could be ground calcium carbonate or in particular precipitated calcium carbonate, or it may be preferred to use titanium dioxide as the filler material. Examples of other filler materials include synthetic polymeric fillers.

The cellulosic suspension may desirably have a high conductivity, for instance at least 1500 µS/cm, suitably at least 2000 µS/cm, such as at least 2500 µS/cm or at least 3000 µS/cm, or even at least 3500 µS/cm.

In addition to the other additives mentioned herein the cellulosic suspension may also contain whitening agents, optical brightening agents or dyes etc.

Generally, the cellulosic suspension may comprise at least 5% by weight filler material, based on the dry weight of the cellulosic suspension. Typically, the amount may be up to 40% filler, preferably from 10% to 40% filler. Desirably, the final sheet of paper or paperboard may comprise up to 40% by weight filler. Alternatively, it may be desirable to provide a paper or paperboard product that is substantially free of filler. In this case the amount of filler may be no more than 8% by weight filler material, typically no more than 5% by weight filler, for instance from 0% to 5 weight %, typically from 0.5 to 5 weight %.

Usually, the cellulosic suspension is first formed as a high consistency stock, often termed a thick stock. Typically, the concentration of the thick stock would be at least 3% and generally higher than this. Frequently, a thick stock suspension may have a concentration from above 3% to 6%, for instance from 4% to 5%.

Typically, in the papermaking processes of the present invention the thick stock suspension would usually be diluted to form a low consistency stock, often termed a thin stock. Suitably, the thick stock may be diluted with dilution water, for example drained white water which has been recycled from the sheet forming section of the paper machine. Thus, as is customary in papermaking processes the thin stock would be the cellulosic suspension which flows as a stream from the aforementioned dilution stage to the machine wire, through which the cellulosic suspension would be drained. Desirably the thin stock may have a concentration of from 0.01% to 2%, 2.5% or in some cases even 3%, based on the dry weight of the solid on the total weight of the thin stock. Often the concentration may be from 0.05% to 2.5% or from 0.1% to 2% or 2.5%, for instance from 0.2% to 2% of 2.5% or from 0.5% to 2% or 2.5%, frequently from 1% to 2% or 2.5%.

Typically, the cellulosic suspension may be passed through one or more shear stages and before being flowed to the machine wire.

By shear stages, we mean stages in the papermaking process where the cellulosic suspension is subjected to significant shearing forces. Typically, this may be at least one of pumping, cleaning or screening stages. This may be, for instance, one or more fan pumps or the pressure screen, sometimes referred to as centri-screen.

The final or last shear stage before the cellulosic suspension is fed into the headbox, which may be referred to as the constant flow box, is normally the aforementioned pressure screen. From the headbox, the cellulosic suspension would usually flow onto the machine wire, which is typically a wire mesh which usually moves.

In a further preferred embodiment of the present invention, the cationic polymer (ii) of the retention system is added to the cellulosic suspension prior to a shear stage and the aqueous formulation prepared from the composition of the invention (i) is added after that shear stage.

In a still further preferred embodiment of the present invention, the cationic polymer (ii) of the retention system is added to the cellulosic suspension prior to a shear stage and the aqueous formulation prepared from the inventive composition (i) and the aforementioned inorganic microparticle are each added after that shear stage.

By addition "after that shear stage" we mean that the inventive composition or the inventive composition and the inorganic microparticle may be added to the cellulosic suspension anywhere after "that shear stage". Therefore, it would be contemplated within the scope of the present invention that the cellulosic suspension, so treated by the cationic polymer, may be passed through one or more shear stages before the inventive composition and, where added, the inorganic microparticle are each added. For instance, it may be desirable for the cationic polymer to be added before one shear stage and then between that shear stage and a next shear stage one of inventive composition or the inorganic microparticle is added and then after passing the cellulosic suspension through the next shear stage addition of the other of the inventive composition or the inorganic microparticle.

Thus, the inventive composition and the inorganic microparticle may be added to the cellulosic suspension sequentially in any order or alternatively may be added simultaneously.

As discussed above, suitably the composition of the present invention would be prepared in the form of a water in oil emulsion or a water in oil microemulsion. Although it would be conceivable that such a water in oil emulsion or a water in oil microemulsion may be used directly, for instance as part of the retention system in the paper or paperboard making process, it is preferred that such emulsion or microemulsion would be inverted into water such that the inventive composition containing the microparticles would be in the form of an aqueous formulation containing the inventive microparticles.

Thus, the inventive composition, for instance as the aqueous formulation, containing the inventive microparticles may be employed in the paper or paperboard making process by addition to the cellulosic suspension in an amount of at least 20 ppm by weight of unswollen microparticles on the weight of the dry suspension, although preferably the amount is at least 50 ppm by weight, particularly from 100 to 2000 ppm by weight. Doses of from 150 to 600 ppm by weight are more preferred especially from 200 to 400 ppm by weight.

The inorganic microparticle may be added at a dose of at least 100 ppm, based on the dry weight of the inorganic material on the weight of the dry suspension. Desirably, the dose of the inorganic microparticle may be in the range of from 500 or 750 ppm to 10,000 ppm by weight. Doses of 1000 to 2000 ppm, by weight, have been found to be particularly suitable.

The cationic polymer of the retention system may generally be added in an amount of about 20 ppm, by dry weight of cationic polymer based on the dry weight of the cellulosic suspension. Preferably, the cationic polymer is added in an amount of at least 50 ppm by weight, for instance from 100 to 2000 ppm by weight. Typically, the cationic polymer dose may be from 150 ppm to 600 ppm by weight, especially from 200 to 400 ppm.

EXAMPLES

The following examples illustrate the present invention. They are not to be construed as limitations on the present invention, except as set forth in the appended claims.

Procedure for the preparation of anionic microemulsion:
Polymerization is done in two stages.

For the first stage, the oil phase consisting of Exxsol D100S (333.3 parts), Polyoxyethylene sorbitol hexaoleate (50.0 parts) and sorbitan sesquioleate (8.5 parts) is charged into a glass reactor (3 openings+2 Claisen adapters) equipped with a temperature control, mechanical stirrer (anchor type), condenser, nitrogen inlet and septum for initiator dosing.

The aqueous phase is prepared by sequentially mixing acrylic acid (AA), deionized water, 2-acrylamido-2-methyl propane sulphonic acid, sodium salt (Na-ATBS), Trilon C (DTPA), methylenebisacrylamide and acrylamide (AMD) in a 4-neck flask equipped with thermometer, stirrer, dropping funnel and condenser. Ammonium hydroxide solution is added slowly until a final pH of 8.1-8.3 is reached, keeping the temperature at 15-20° C. The prepared aqueous phase corresponds to 110% of the required aqueous phase, as an excess is needed for the dosing system.

For the first stage polymerization, 379 parts of the aqueous phase are charged into the reactor already containing 391.8 parts of the oil phase. The resulting microemulsion is degassed by bubbling with nitrogen for at least 45 min. At the end, the temperature of the microemulsion is adjusted to 20° C. Bubbling with nitrogen is continued during the whole polymerization time The polymerization is started by adding tertbutyl hydroperoxide (tBHP, 0.05% solution in deionized water) and sodium metabisulfite (SMBS, 0.05% solution in deionized water) at a feed rate of 20 mL/h until a temperature increase of 1° C. is observed. Then the feed rate is reduced to 3 mL/h and feeding is continued until $T_{max}$ is reached and temperature begins to decline.

For the second stage polymerization, the reactor is cooled to room temperature and the rest of the aqueous phase (296 parts) is charged into the reactor followed by degassing with nitrogen for another 45 min. At the end, the temperature of the microemulsion is adjusted to 20° C. Bubbling with nitrogen is continued during the whole polymerization time The polymerization is started by adding tertbutyl hydroperoxide (tBHP, 0.05% solution in deionized water) and sodium metabisulfite (SMBS, 0.05% solution in deionized water) at a feed rate of 20 mL/h until a temperature increase of 1° C. is observed. Then the feed rate is reduced to 6 mL/h and feeding is continued until $T_{max}$ is reached. Initiator feed is further continued at a feed rate of 6 mL/h until temperature has declined to 10° C. below $T_{max}$.

Example 1

40 AMD/59 AA/1 Na-ATBS, 99 ppm MBA (on Total Monomer Weight): Product 1

The reaction is a polymerization of 40/59/1 (mole %) acrylamide/acrylic acid ammonium salt/Na-ATBS in inverse microemulsion.

The aqueous phase is prepared by mixing acrylic acid (100%, 187.1 parts), deionized water (126.8 parts), Na-ATBS (50%, 20.6 parts), Trilon C (40%, 1.6 parts), methylenebisacrylamide (1%, 3.2 parts) and acrylamide (50%, 248.4 parts) in a 4-neck flask equipped with thermometer, stirrer, dropping funnel and condenser. Ammonium hydroxide solution (29%, 162.5 parts) is added slowly until a final pH of 8.1-8.3 is reached, keeping the temperature at 15-20° C. The prepared aqueous phase corresponds to 110% of the required aqueous phase, as an excess is needed for the dosing system.

Polymerization is performed as described in the procedure for the preparation of anionic micro-emulsion.

Example 2

40 AMD/57.5 AA/2.5 Na-ATBS, 96 ppm MBA (on Total Monomer Weight): Product 2

The reaction is a polymerization of 40/57.5/2.5 (mole %) acrylamide/acrylic acid ammonium salt/Na-ATBS in inverse microemulsion.

Polymerization is done in two stages.

The aqueous phase is prepared by mixing acrylic acid (100%, 180.8 parts), deionized water (101.8 parts), Na-ATBS (50%, 50.2 parts), Trilon C (40%, 1.7 parts), methylenebisacrylamide (1%, 3.2 parts) and acrylamide (50%, 248.5 parts) in a 4-neck flask equipped with thermometer, stirrer, dropping funnel and condenser. Ammonium hydroxide solution (29%, 156.4 parts) is added slowly until a final pH of 8.1-8.3 is reached, keeping the temperature at 15-20° C. The prepared aqueous phase corresponds to 110% of the required aqueous phase, as an excess is needed for the dosing system.

Polymerization is performed as described in the procedure for the preparation of anionic micro-emulsion.

Example 3

40 AMD/55 AA/5 Na-ATBS, 91 ppm MBA (on Total Monomer Weight): Product 3

The reaction is a polymerization of 40/55/5 (mole %) acrylamide/acrylic acid ammonium salt/Na-ATBS in inverse microemulsion.

Polymerization is done in two stages.

The aqueous phase is prepared by mixing acrylic acid (100%, 173.1 parts), deionized water (62.5 parts), Na-ATBS (50%, 100.1 parts), Trilon C (40%, 1.6 parts), methylenebisacrylamide (1%, 3.2 parts) and acrylamide (50%, 248.5 parts) in a 4-neck flask equipped with thermometer, stirrer, dropping funnel and condenser. Ammonium hydroxide solution (29%, 153 parts) is added slowly until a final pH of 8.1-8.3 is reached, keeping the temperature at 15-20° C. The prepared aqueous phase corresponds to 110% of the required aqueous phase, as an excess is needed for the dosing system.

Polymerization is performed as described in the procedure for the preparation of anionic micro-emulsion.

Example 4

40 AMD/50 AA/10 Na-ATBS, 83 ppm MBA (on Total Monomer Weight): Product 4

The reaction is a polymerization of 40/50/10 (mole %) acrylamide/acrylic acid ammonium salt/Na-ATBS in inverse microemulsion.

The aqueous phase is prepared by mixing acrylic acid (100%, 157.3 parts), Na-ATBS (50%, 200.4 parts), Trilon C (40%, 1.7 parts), methylenebisacrylamide (1%, 3.2 parts) and acrylamide (50%, 249.0 parts) in a 4-neck flask equipped with thermometer, stirrer, dropping funnel and condenser. Ammonium hydroxide solution (29%, 138.0 parts) is added slowly until a final pH of 8.1-8.3 is reached, keeping the temperature at 15-20° C. The prepared aqueous phase corresponds to 110% of the required aqueous phase, as an excess is needed for the dosing system.

Polymerization is performed as described in the procedure for the preparation of anionic micro-emulsion.

Evaluation on a Papermaking Stock

The compositions prepared by Examples 1-4, identified as Products 1-4 were evaluated in a laboratory simulation of a papermaking process and compared to a composition according to EP 484617, containing no 2-acrylamido-2-methyl propane sulphonic acid and identified as Product 0. The respective compositions were each tested as aqueous formulations at doses of 0.005%, 0.01% and 0.02% based on the active microparticle content of each product on dry solids of the cellulosic suspension.

The papermaking stock used in the evaluation was a coated paper consisting of 70% bleached kraft hardwood and 30% bleached kraft softwood. It had a stock consistency of 10.12 g/L, contained filler in an amount of 3.90 g/L, exhibited a conductivity of about 4000 µS/cm.

Description of the Other Retention Additives Used

Percol PR 8397 X—Cationic polyacrylamide powder (solid content: ca 90%) consisting of a 10 moles % methyl chloride quaternary ammonium salts of dimethyl amino ethyl acrylate and 90 moles % acrylamide with an Intrinsic Viscosity of 13.3 dl/g. (solution prepared at 0.05% active polymer using deionised water before dosing to the furnish)

OC—Hydrocol® OC—sodium bentonite powder (solid content: ca 90%) (solution prepared at 0.1% solids using deionised water before dosing to the furnish)

The retention tests were done using a DFR 05 from the company BTG (60 mesh copper screen). 1000 ml of thin stock furnish is introduced in the DFR 05 and the polymers introduced following the below chemical dosing sequence.

The dewatering tests were conducted on a modified Shopper Riegler having a stopper on the bottom. In a 1500 ml plastic beaker, 1000 ml of thin stock furnish is stirred using a marine type propeller and the chemicals are dosed following the below chemical introduction sequence. At the end of the sequence, the stock is placed in the modified Shopper Riegler and the time is measured to collect 700 ml of dewatered white water on the side of the equipment.

Both tests (retention and dewatering) would be done on a room temperature furnish.

Chemical Addition Introduction Sequence:
at t=0 second, start of the stirrer at 1000 rpm
at t=10 seconds, addition of the Percol PR 8397 X (see table 1)
at t=60 seconds, reduction of the stirrer speed at 750 rpm and simultaneous introduction of the microemulsion (Products 0 to 4) and the Bentonite micro-particle (see table 1)
at t=65 seconds, 200 ml of white water is collected from the DFR 05

The retention is evaluated by the measurement of the total solids concentration found in a sample of 100 ml of white water (filtration of the white water made with an ash free filter paper type Whatmann 542).

The First Pass Retention is then determined by the following ratio:

FPR (%)=([furnish concentration %]−[white water concentration])/[furnish concentration]

The First Pass Ashes Retention is determined by burning the filters produced by the FPR determination in an oven at 550° C. for 4 hours enabling the calculation of the ashes concentration in the white water, the FPAR is then determined by the following ratio:

FPAR (%)=([ashes furnish concentration %]−[ashes white water concentration])/[ashes furnish concentration]

Figure 1:
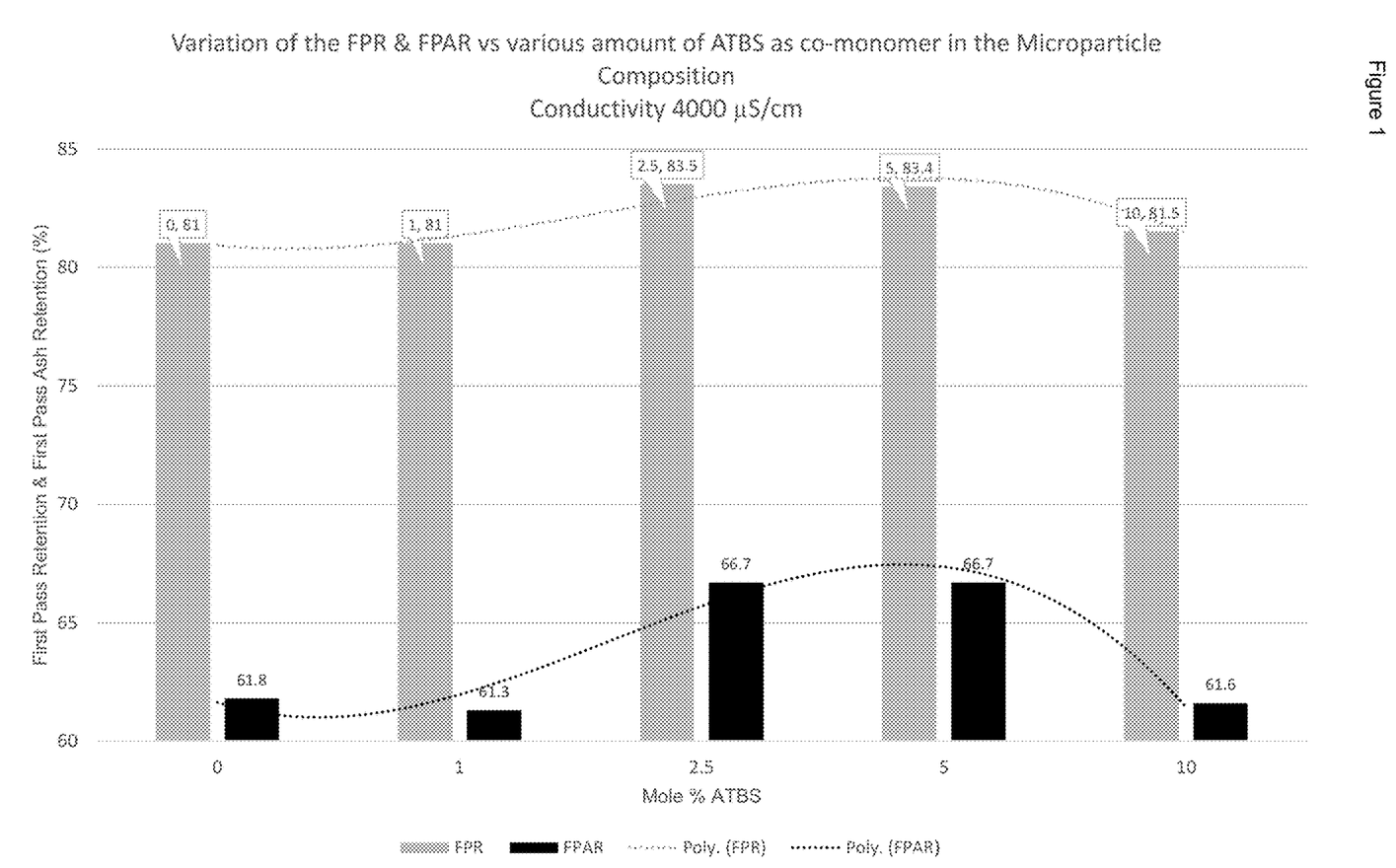
FIG. 1 represents the First Pass Retention (FPR) and First Pass Ash Retention (FPAR) using 0.02% (based on active polymer content) of compositions containing the organic polymeric microparticles with varying amounts of 2-acrylamido-2-methyl propane sulphonic acid (ATBS).

The results of the test work are presented in Table 1 and in FIG. 1.

TABLE 1

| Test | 1 | 2 | 3 | 4 | 5 | 6 | 7 | 8 | 9 |
|---|---|---|---|---|---|---|---|---|---|
| PR8397X |  | 0.025 | 0.025 | 0.025 | 0.025 | 0.025 | 0.025 | 0.025 | 0.025 |
| Product 0 |  |  | 0.005 | 0.01 | 0.02 |  |  |  |  |
| Product 3 |  |  |  |  |  | 0.005 | 0.01 | 0.02 |  |
| Product 2 |  |  |  |  |  |  |  |  | 0.005 |
| Product 1 |  |  |  |  |  |  |  |  |  |
| Product 4 |  |  |  |  |  |  |  |  |  |

TABLE 1-continued

| | | | | | | | | | |
|---|---|---|---|---|---|---|---|---|---|
| OC | | 0.1 | 0.1 | 0.1 | 0.1 | 0.1 | 0.1 | 0.1 | 0.1 |
| Drainage | 87 | 39 | 38 | 40 | 41 | 42 | 39 | 39 | 37 |
| FPR | 57.7 | 78.0 | 79.2 | 81.3 | 81.0 | 80.6 | 82.1 | 83.4 | 80.3 |
| FPAR | 6.8 | 56.5 | 58.8 | 63.1 | 61.8 | 59.5 | 62.1 | 66.7 | 58.2 |

| Test | 10 | 11 | 12 | 13 | 14 | 15 | 16 | 17 |
|---|---|---|---|---|---|---|---|---|
| PR8397X | 0.025 | 0.025 | 0.025 | 0.025 | 0.025 | 0.025 | 0.025 | 0.025 |
| Product 0 | | | | | | | | |
| Product 3 | | | | | | | | |
| Product 2 | 0.01 | 0.02 | | | | | | |
| Product 1 | | | 0.005 | 0.01 | 0.02 | | | |
| Product 4 | | | | | | 0.005 | 0.01 | 0.02 |
| OC | 0.1 | 0.1 | 0.1 | 0.1 | 0.1 | 0.1 | 0.1 | 0.1 |
| Drainage | 39 | 34 | 36 | 36 | 36 | 37 | 36 | 30 |
| FPR | 80.2 | 83.5 | 77.0 | 80.5 | 81.0 | 78.6 | 79.8 | 81.0 |
| FPAR | 58.5 | 66.7 | 53.1 | 60.3 | 61.3 | 54.7 | 57.0 | 61.3 |

The invention claimed is:

1. A composition comprising cross-linked anionic, organic polymeric microparticles, said microparticles having an unswollen z-average particle size diameter of less than 0.75 μm, wherein the organic polymeric microparticles are formed from a monomer mixture comprising
   (a) an ethylenically unsaturated carboxylic acid, or a salt thereof;
   (b) an ethylenically unsaturated non-ionic monomer; and
   (c) from about 1 to about 10 mole % of 2-acrylamido-2-methylpropanesulphonic acid, or a salt thereof.

2. A composition according to claim 1, wherein the monomer mixture comprises a multi functional compound selected from the group of N,N'-methylenebisacrylamide, N,N'-methylenebismethacrylamide, polyethyleneglycol dimethacrylate, polyethyleneglycol diacrylate, N-vinylacrylamide, glycidyl acrylate, divinylbenzene, tetraallyl ammonium chloride, acrolein, aldehydes, glyoxal, diepoxy compounds, epichlorohydrin and mixtures thereof.

3. A composition according to claim 1, wherein the ethylenically unsaturated carboxylic acid (a) is selected from the group of acrylic acid, methacrylic acid, ethacrylic acid, maleic acid, fumaric acid, itaconic acid, crotonic acid, mixtures thereof, and salts thereof.

4. A composition according to claim 1, wherein the ethylenically unsaturated non-ionic monomer (b) is selected from acrylamide, methacrylamide or mixtures thereof.

5. A composition according to claim 1, wherein the monomer mixture comprises,
   (a) from about 40 to about 90 mole % of an ethylenically unsaturated carboxylic acid, or a salt thereof;
   (b) from about 5 to about 55 mole % of an ethylenically unsaturated non-ionic monomer; and
   (c) from about 1 to about 10 mole % of 2-acrylamido-2-methylpropanesulphonic acid, or a salt thereof.

6. A composition according to claim 1, wherein component (c) of the monomer mixture is present in an amount of from about 2 to about 8 mole %.

7. A composition according to claim 1, wherein the monomer mixture comprises,
   (a) from about 45 to about 65 mole % of acrylic acid, or salts thereof;
   (b) from about 30 to about 50 mole % of acrylamide; and
   (c) from about 1 to about 10 mole % of 2-acrylamido-2-methylpropanesulphonic acid, or a salt thereof.

8. A composition according to claim 1, wherein the unswollen number average particle size diameter is less than 0.5 μm.

9. A composition according to claim 1, wherein component (c) of the monomer mixture is present in an amount of from about 2.5 to about 7.5 mole %.

10. A process for the preparation of a composition defined in claim 1, said process comprising:
   (A) admixing
      (i) an aqueous solution of a monomer mixture comprising
         (a) an ethylenically unsaturated carboxylic acid, or a salt thereof;
         (b) an ethylenically unsaturated non-ionic monomer; and
         (c) from about 1 to about 10 mole % of 2-acrylamido-2-methylpropanesulphonic acid, or a salt thereof;
      (ii) an oil phase comprising at least one hydrocarbon liquid;
      (iii) an effective amount of surfactant or surfactant mixture, so as to form an inverse emulsion; and
   (B) subjecting the inverse emulsion obtained in step (A) to polymerisation conditions.

11. A method of producing paper or paperboard wherein a cellulosic suspension is provided and drained on a screen to form a sheet which is dried,
   wherein the method comprises applying a retention system to the cellulosic suspension,
   wherein the retention system comprises an aqueous formulation prepared from the composition defined in claim 1.

12. A method according to claim 11 wherein the retention system comprises (i) the aqueous formulation; and (ii) a cationic polymer.

13. A method according to claim 12 wherein the cationic polymer (ii) is added to the cellulosic suspension prior to a shear stage and the aqueous formulation (i) is added after that shear stage.

14. A method according to claim 11 wherein the retention system comprises (i) the aqueous formulation; (ii) a cationic polymer; and (iii) an inorganic microparticle.

15. A method according to claim 14 wherein the cationic polymer (ii) is added to the cellulosic suspension prior to a shear stage and the aqueous formulation (i) and the inorganic microparticle are each added after that shear stage.

16. A method according to claim 11, wherein the monomer mixture comprises,
   (a) from about 45 to about 65 mole % of acrylic acid, or salts thereof;
   (b) from about 30 to about 50 mole % of acrylamide; and
   (c) from about 1 to about 10 mole % of 2-acrylamido-2-methylpropanesulphonic acid, or a salt thereof.

* * * * *